Aug. 30, 1938.   J. R. CLEMMONS   2,128,452
FLUID PROPORTIONING AND MIXING APPARATUS
Filed July 6, 1937   3 Sheets-Sheet 1
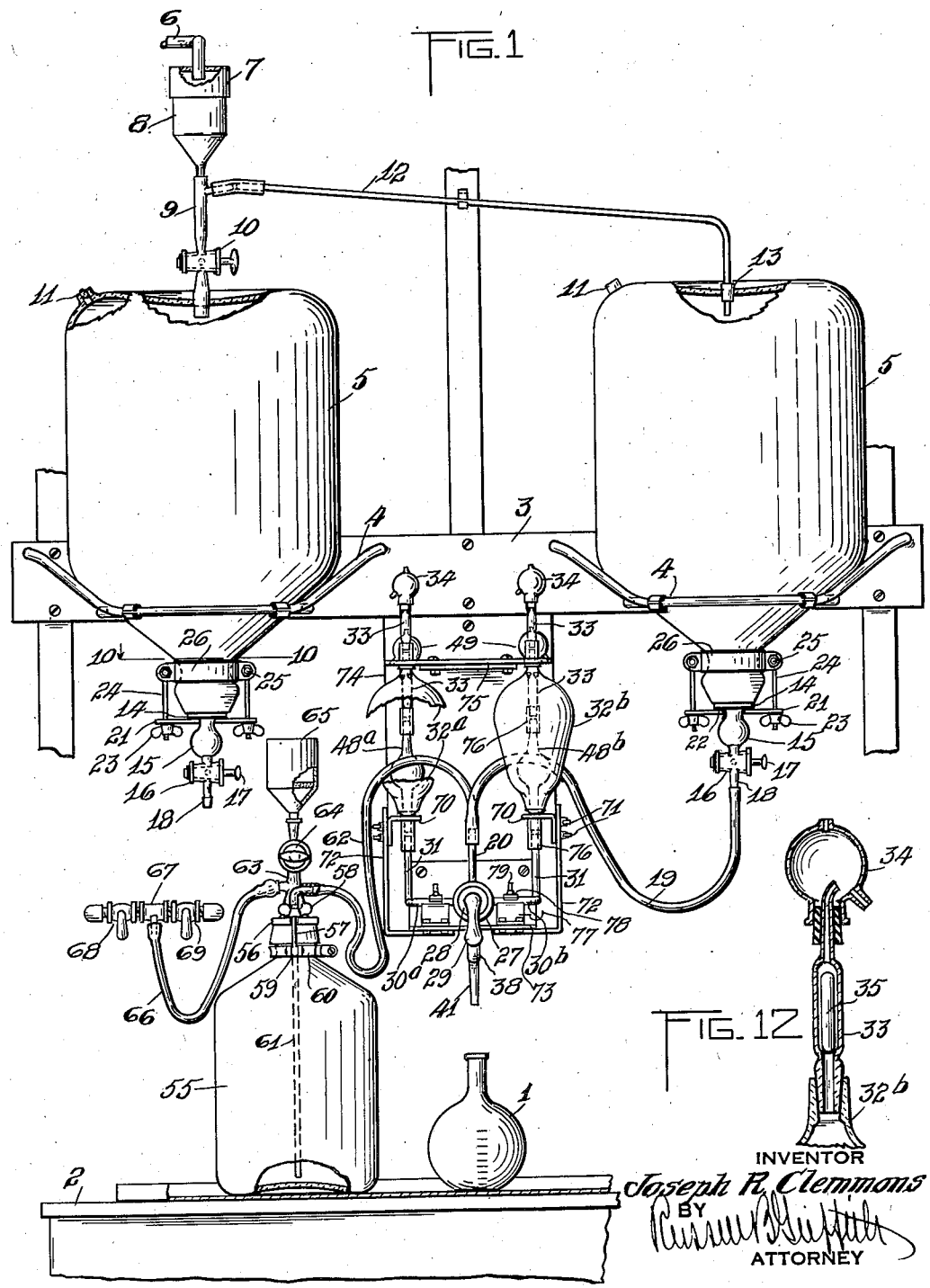
INVENTOR
Joseph R. Clemmons
BY
ATTORNEY Aug. 30, 1938.　　　J. R. CLEMMONS　　　2,128,452
FLUID PROPORTIONING AND MIXING APPARATUS
Filed July 6, 1937　　　3 Sheets-Sheet 2
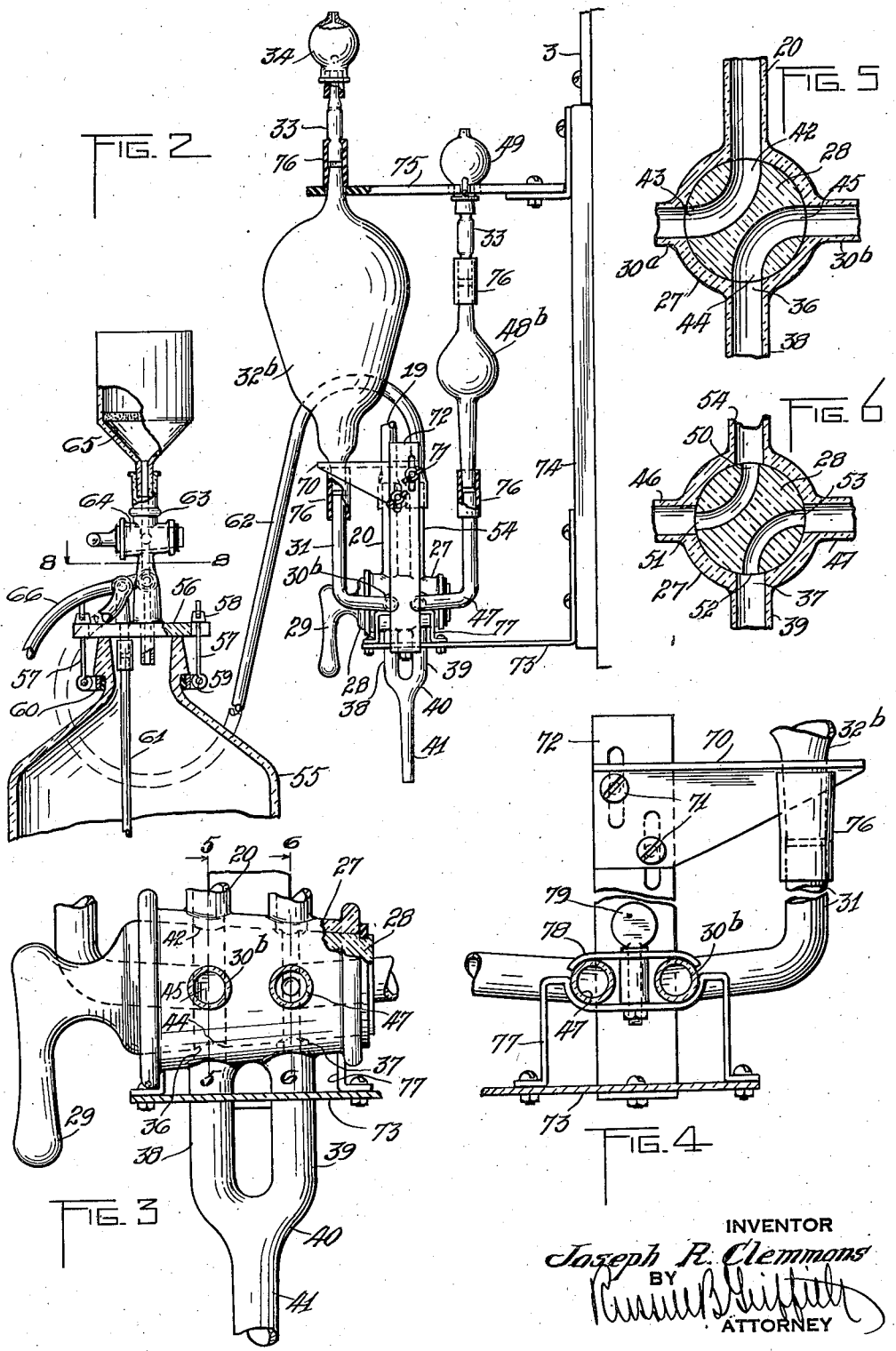
INVENTOR
Joseph R. Clemmons
BY
ATTORNEY Aug. 30, 1938.                J. R. CLEMMONS                2,128,452
                    FLUID PROPORTIONING AND MIXING APPARATUS
                         Filed July 6, 1937        3 Sheets-Sheet 3
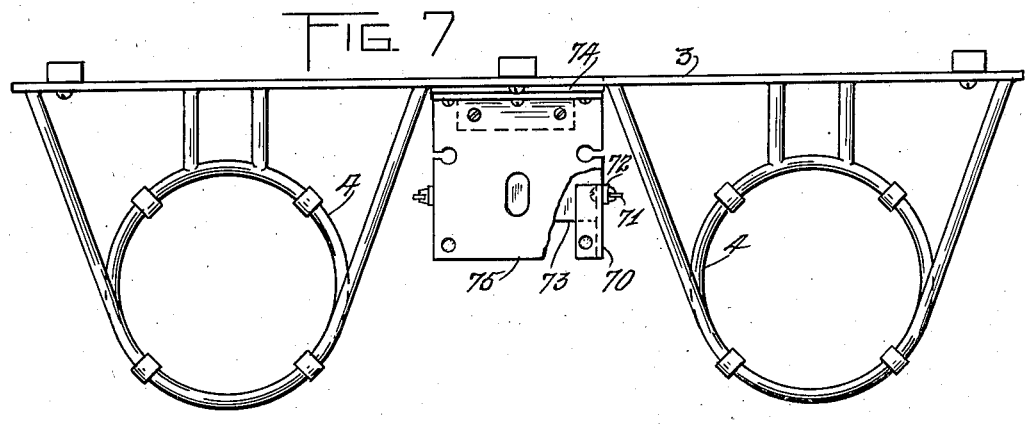
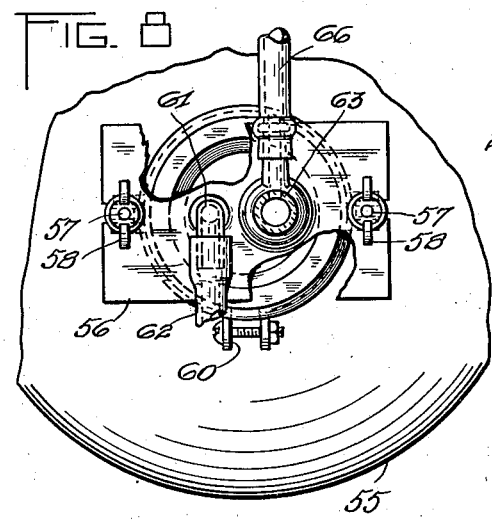
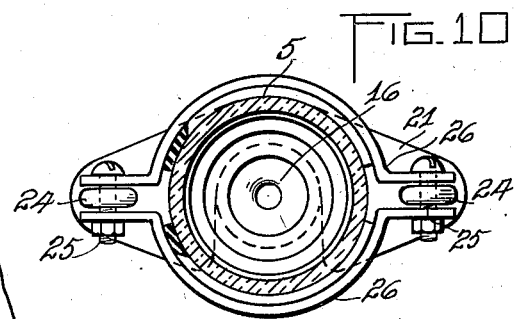
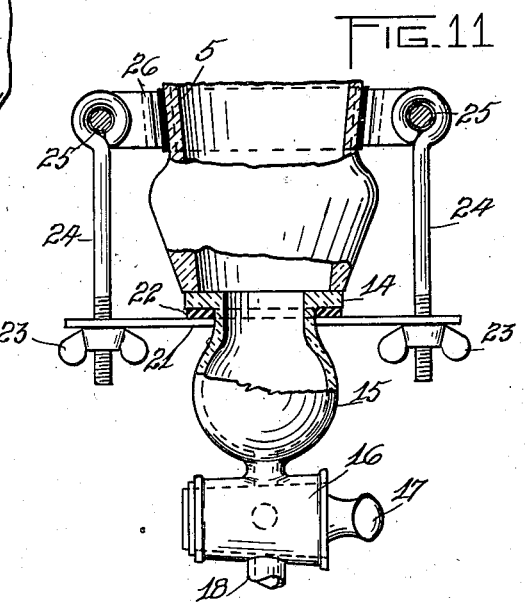
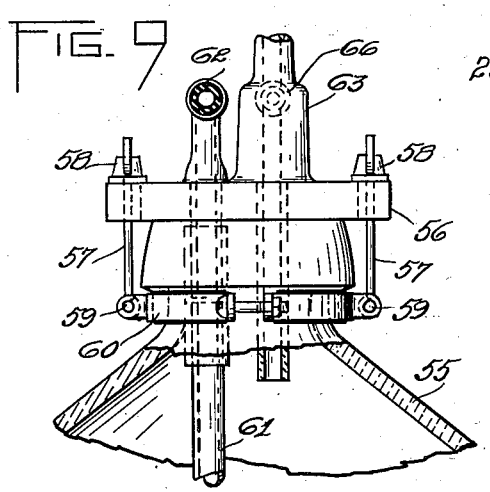
INVENTOR
Joseph R. Clemmons
BY
ATTORNEY Patented Aug. 30, 1938

2,128,452

UNITED STATES PATENT OFFICE 2,128,452

FLUID PROPORTIONING AND MIXING APPARATUS

Joseph R. Clemmons, Rochester, N. Y.

Application July 6, 1937, Serial No. 152,231

8 Claims. (Cl. 221—96)

My present invention relates to apparatus for mixing fluids and dispensing or decanting the same and for proportioning the fluids in a mixture on a predetermined formula. It has for its object to provide a relatively simple apparatus of this character suitable for use in surgical laboratories and the like and through the employment of which the mixing may be accomplished as a continuous process while the product is drawn off for use as desired at the dispensing point at the same time. The improvements are directed in part toward means for forcibly filtering into a suitable container a supply of base concentrate and in turn force it from there into a measuring station, toward means for supplying a diluent from a reservoir to a companion measuring station and toward means for draining the two stations concomitantly through a mixing chamber to a discharge point. The improvements further relate to providing an arrangement whereby a plurality of such instrumentalities work alternatively under one control so that the measuring process may continue while the decanting process proceeds uninterruptedly. To these and other ends, the invention resides in certain improvements and combinations of parts, all as will be hereinafter more fully set forth, the novel features being pointed out in the claims at the end of this specification.

In the drawings:

Fig. 1 is a front elevation of a proportioning and mixing apparatus constructed in accordance with my invention, one of the forwardly arranged diluent measuring station tubes being broken away to reveal the concentrate measuring station tube in the rear and other detail parts being similarly shown partly in section and broken away;

Fig. 2 is an enlarged side view partly in section of one measuring station unit, the mixing and dispensing cock, and a portion of the concentrate supply structure;

Fig. 3 is a further enlarged side view of the control cock and mixer partly in section and with adjacent parts broken away or in vertical section;

Fig. 4 is a detail vertical section partly broken away and on the same scale showing the manner of supporting a pair of the lead pipes to and from the mixer;

Fig. 5 is a vertical section taken substantially on the line 5—5 of Fig. 3;

Fig. 6 is a vertical section taken substantially on the line 6—6 of Fig. 3;

Fig. 7 is a top plan view on the scale of Fig. 1 of the general supporting structure with the functioning portions of the apparatus removed;

Fig. 8 is a top plan view of the concentrate receptacle partly broken away and enlarged, the same being in horizontal section on the line 8—8 of Fig. 2;

Fig. 9 is an enlarged side view thereof on the same scale;

Fig. 10 is an enlarged horizontal section through the discharge neck of a diluent reservoir taken substantially on the line 10—10 of Fig 1;

Fig. 11 is a front view thereof on the same scale and partly in vertical section, this view otherwise reproducing on that scale the corresponding showing of Fig. 1, and Fig. 12 is a detail sectional view enlarged of the vent and automatic float valve for one of the measuring stations.

Similar reference numerals throughout the several views indicate the same parts.

The embodiment of the invention illustrated in the accompanying drawings is designed particularly for preparing in a surgical laboratory solutions such as are used for transfusional operations on the blood stream and the like. In such practices, stock concentrates, usually manufactured outside of the laboratory, are used as a base and these are diluted to the proper extent for the purposes in hand with freshly distilled water. The resulting dilution product is decanted into successive individual flasks such as that shown at 1 in Fig. 1, and the flasks are transported to the scene of operations and their contents applied in service by means constituting no part of this invention, which latter is restricted in its purpose, in this particular embodiment, to the filling of the flasks. As before indicated, the apparatus is of a tandem nature involving in major respects units that are duplicates of each other wherefor a description of one side of the apparatus will suffice for both.

Referring more particularly to the drawings, 2 indicates generally a laboratory table and 3 a wall support erected in rear thereof. Saddle brackets 4 on the wall support (Figs. 1 and 7) maintain at an elevation sufficient for a gravity feed a pair of carboys 5 which constitute a twin source of supply for the diluent which is, of course, used in the greater quantity.

In the present instance, the diluent is distilled water and is preferably freshly distilled water originating in a still conveniently adjacently arranged, say, in a room beyond the supporting wall. The delivery pipe from the still is indicated at 6 in Fig. 1. It is let into the glass cap 7 of a Jens fritted filter funnel 8 having a ground joint connection with a glass tube 9 similarly connected with and erected upon a left hand carboy 5, said tube being provided with a ground glass shut-off cock 10. Both carboys or reservoirs 5 have suitable air filtering vents 11. A by-pass tube 12 runs from the tube 9 over to delivering connection with the right hand carboy or reservoir 5 at 13 from which arrangement it is obvious that either reservoir may be filled with distilled water following the filling of the other.

Referring more particularly to Figs. 1, 10 and 11, each reservoir 5 is provided with a drainage or feed connection for which purpose the rim of its mouth is ground to be sealed by the similarly ground base collar 14 of the enlargement 15 on a ground glass stop cock indicated generally at 16 and having a handle portion 17, the same including a nipple 18 for the attachment of flexible hose 19. Such a hose is shown connected to the right hand reservoir in Fig. 1 but is omitted from the left hand reservoir in the same figure to avoid obscuring other parts. Suffice it to say that either of such hoses 19 is adaptable to a slip-on connection with a glass nipple 20 hereinafter referred to in completing the description of the filling and drainage system.

Going back to the reservoir connection 14—15, the collar 14 is held against the mouth of the reservoir 5 in each instance by a plate 21 clamped against the same through the medium of an exterior rubber gasket 22 by means of thumb nuts 23 on swinging bolts 24 having eyes pivoted at 25 in clamp straps 26 held to the neck of the container by the pivot bolts.

The said nipple 20 that takes the hose connections 19 rises from a glass valve casing 27 in which rotates a ground glass valve 28 having an operating handle 29, the same being shown in enlarged side elevation in Fig. 3 and in two sectional planes in Figs. 5 and 6.

Leading laterally from and, in the present instance, horizontally from the valve casing 27 in opposite directions are two glass pipes 30$^a$ and 30$^b$ that thence rise vertically at 31 and support, respectively, two tubes or measuring bulbs 32$^a$ and 32$^b$. These in turn are surmounted through similar ground glass joints by vent pipes 33 equipped with suitable air expulsion heads 34 that do not permit unfiltered air entering the measuring tubes from the atmosphere. These tubes 32$^a$ and 32$^b$ are of known and predetermined capacity and constitute what I term the measuring stations of the distilled water supply system. As shown in detail in Fig. 12, they are provided with automatic shut offs in the form of float valves 35 that seal the vent in each instance when the measuring tube of that station is completely filled.

Returning to the control valve 28 in the casing 27, the latter has two ports 36 and 37 leading downwardly to two discharge pipes 38 and 39 that are siamesed at 40 to constitute a mixing chamber that finally terminates in a common discharge 41 for both the distilled water or diluent fluid system and the concentrate system hereinafter described. This discharge nozzle 41 is the delivery point of the apparatus at which the first mentioned flasks 1 are filled.

The control valve 28 in the casing 27 is a double four-way valve of which the four-way unit shown in section in Fig. 5 controls the distilled water system. It embodies connected ports 42 and 43. When these are respectively in register with nipple 20 and pipe 30$^a$, as in the section, it is clear, cock 17 being opened, that the water supply from whichever reservoir 5 is connected by pipe 19 to said nipple will flow by gravity into the left hand measuring station 32$^a$ and fill the same to the closing of automatic valve 35, at which point cock 17 is closed and a measured quantity of water is held in the tube station ready for use. Or, the same result of shutting off the supply of diluent may be obtained by turning valve 28 to a neutral position 45° to the right of the showing of Fig. 5. Upon turning it 90° to the right, port 43 of the valve will register with intake nipple 20 while connected port 42 will register with pipe 30$^b$ and similarly fill the right hand station tube 32$^b$.

This last mentioned adjustment simultaneously starts the draining of measuring station tube 32$^a$ because port 44 of the four-way valve unit is meanwhile connected with pipe 30$^a$ while its companion port 45 is in register with discharge pipe 38. Thus, filling station tubes 32$^a$ and 32$^b$ are individually either filling or emptying at all times unless the valve 28 is turned to a neutral position that isolates both.

I will now describe the similar method of filling and emptying measuring stations that supply the desired amounts of concentrate solution to be admixed with the distilled water or diluent. Also leading laterally from the valve casing 27 in opposite directions are two pipes 46 and 47 suitably connected by ground glass joints or unions with two measuring tubes 48$^a$ and 48$^b$. These constitute the concentrate measuring stations and, as shown, are therefore smaller than the tubes 32$^a$ and 32$^b$. However, they are set up in the same manner as the companion system with automatic shut off float valves such as illustrated in Fig. 12 and air vents 49.

As first described, the section of Fig. 6 is through that portion of the common control valve 28 in casing 27 that intersects these pipes 46 and 47 to the smaller concentrate measuring stations. The control valve is there provided with ports 50, 51, 52 and 53 that selectively register with a supply pipe 54 leading into the valve casing 27 by which the concentrate is supplied to the two tubes 48$^a$ or 48$^b$ or connects the latter alternatively with discharge pipe 39 leading into mixing chamber 40 and discharge 41 whereby a proportional amount of concentrate is mixed with the diluent from the corresponding larger measuring tube or station. In other words, the turning of the double four-way valve 28 through 90° simultaneously connects up one diluent measuring station and one concentrate measuring station for filling and connects up the other two for drainage through the mixing chamber 40 and the common discharge 41 to the flasks 1 so that the filling supply to the latter is continuous. As soon as the contents of a reservoir 5 are exhausted the pipe 19 of the other reservoir is substituted for it on the intake pipe 20 of the controlling valve and mixer.

In the present embodiment of the invention, the supply of concentrate solution is not fed by gravity. Instead, I provide a container 55 that is set up on the table 2. Its mouth has a ground glass rim fitting against a glass block 56 that is held against it by swinging bolts 57 and thumb nuts 58, which bolts are pivoted at 59 upon clamps 60 surmounting the neck of the container in much the same way as the drainage connections are fitted to the reservoirs 5. Siphon tube 61 extends from the bottom of this container through the closure 56 and is connected by a flexible hose 62 to the concentrate intake pipe 54 of the control valve casing 27. Rising from the closure 56 is a tube 63 having a shut-off cock 64 and surmounted by a filtering funnel 65 provided with a filtering medium similar to the filtering medium 8 that receives the distillate. A hose 66 connects pipe 63 below the shut-off cock with a source 67 of negative and positive air pressure. A valve 68 thereon introduces the positive pressure and a valve 69 thereon introduces negative pressure through hose 66 to the interior of container 55.

The concentrate or stock base heretofore described as being prepared outside and furnished to the laboratory is poured into the filter 65 and the valve 69 turned for negative pressure creating a partial vacuum in container 55. This draws the stock base concentrate rapidly into the bottle. When the latter is sufficiently filled, the valve 69 is closed and the valve 68 opened which constitutes a positive pressure and drives the concentrate solution in container 55 through siphon tube 61 and hose 62 to supply pipe 54 of the mixing and control valves 27—28 for the purpose of filling the concentrate measuring stations 48$^a$ and 48$^b$, as previously described.

As before indicated, the measuring station tubes 32$^a$ and 32$^b$ on the one hand and 48 and 48$^b$ on the other, are proportioned to each other as to size according to the mixing formula used. The units of each set are interchangeable with bulbs of other sizes. In practice I have used 100 cc. bulbs for measuring at the stock solution or concentrate stations and bulbs of 425 cc., 950 cc., and 1475 cc. capacity at the dilution stations. To facilitate such interchanging, the lower supports for the bulb ends consist of brackets 70 held by thumb screw bolts 71 in slotted angle pieces 72 on a lower shelf 73 extending forwardly from the wall support portion 74 as shown in Figures 1, 2 and 4. The upper ends thereof are supported in an upper similarly connected shelf 75. Thus, the longer and shorter tubes of greater and less capacity are accommodated with the aid of rubber unions 76 at the various joints. The tubes 30$^b$ and 47 leading from the control valve to the respective stations rest on saddles 77 on shelf 73 to which saddles they are held by clamp plates 78 and thumb bolts 79.

This incidental structure is not important for all purposes to the practice of my invention and other details may obviously be modified without departing from the spirit thereof.

I claim as my invention:

1. In an apparatus of the character described, the combination with a concentrate conducting system and a diluent conducting system, a source of fluid supply connected to each, respectively, and a common discharge for both systems, of a measuring station in each system, each station having the same conducting element connected therewith for both supply and discharge, and common means connecting the systems for simultaneously controlling both the filling and the emptying of both stations.

2. In an apparatus of the character described, the combination with a concentrate conducting system and a diluent conducting system, a source of fluid supply connected to each, respectively, and a common discharge for both systems, of a measuring station in each system, each station having the same conducting element connected therewith for both supply and discharge, and common means for simultaneously controlling the filling of both stations.

3. In an apparatus of the character described, the combination with a concentrate conducting system and a diluent conducting system, a source of fluid supply connected to each, respectively, and a common discharge for both systems, of a measuring station in each system, each station having the same conducting element connected therewith for both supply and discharge, and common means for simultaneously controlling the emptying of both stations.

4. In an apparatus of the character described, the combination with a concentrate conducting system and a diluent conducting system, a source of fluid supply connected to each, respectively, and a common discharge for both systems, of a measuring station in each system, and a two-way valve in each system for selectively directing the flow through the same conductor connection to the station from the supply source to the measuring station or from the latter to the discharge.

5. In an apparatus of the character described, the combination with a concentrate conducting system, and a diluent conducting system, a source of fluid supply connected to each, respectively, and a common discharge for both systems, of two measuring stations in each system, and means for simultaneously connecting one measuring station in each system with the discharge and the other measuring station in each system with its supply source.

6. In an apparatus of the character described, the combination with a concentrate conducting system, and a diluent conducting system, a source of fluid supply connected to each, respectively, and a common discharge for both systems, of two measuring stations in each system, and a four-way valve adapted to simultaneously connect one measuring station in each system with the discharge and the other measuring station in each system with its supply source.

7. In an apparatus of the character described, the combination with a concentrate conducting system, and a diluent conducting system, a source of fluid supply connected to each, respectively, under a regulatable pressure, and a common discharge for both systems, of two measuring stations in each system, each station having the same conducting element connected therewith for both supply and discharge, and means for simultaneously connecting one measuring station in each system with the discharge and the other measuring station in each system with its supply source, each measuring station being provided with an atmospheric vent at the top and with a float valve for automatically closing the same when the station is filled.

8. In an apparatus of the character described, the combination with a concentrate conducting system and a diluent conducting system, a source of fluid supply connected to each, respectively, and a common discharge for both systems, of a measuring station in each system, each station having the same conducting element connected therewith for both supply and discharge, and common means connecting the systems for simultaneously controlling both the filling and the emptying of both stations, each station comprising a detachable tube for interchangeably varying the measuring capacity of the station.

JOSEPH R. CLEMMONS.